(12) United States Patent
Liess

(10) Patent No.: US 6,816,537 B2
(45) Date of Patent: Nov. 9, 2004

(54) DEVICE HAVING TOUCH SENSITIVITY FUNCTIONALITY

(75) Inventor: Martin Dieter Liess, Eindhoven (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/264,897

(22) Filed: Oct. 4, 2002

(65) Prior Publication Data

US 2003/0160155 A1 Aug. 28, 2003

(30) Foreign Application Priority Data

Oct. 9, 2001 (EP) .............................. 01230816

(51) Int. Cl.[7] .......................... H01S 3/00; G06K 11/08
(52) U.S. Cl. ....................... 372/109; 345/156; 345/173
(58) Field of Search .......................... 372/109; 345/156, 345/173, 175; 250/221

(56) References Cited

U.S. PATENT DOCUMENTS

| 5,164,714 A | 11/1992 | Wehrer | ........................ 340/712 |
| 5,789,739 A | 8/1998 | Schwarz | ...................... 250/221 |
| 6,091,405 A | 7/2000 | Lowe et al. | ................. 345/175 |
| 6,429,856 B1 * | 8/2002 | Omura et al. | ................ 345/175 |
| 6,480,187 B1 * | 11/2002 | Sano et al. | .................. 345/175 |
| 6,498,602 B1 * | 12/2002 | Ogawa | ........................ 345/173 |

OTHER PUBLICATIONS

US 4,733,022, 3/1988, Wales et al. (withdrawn)

* cited by examiner

*Primary Examiner*—Don Wong
*Assistant Examiner*—Leith Al-Nazer

(57) ABSTRACT

The invention relates to a device having touch sensitivity functionality, comprising a surface (2), touch-sensitive means (5) for detecting the presence of a touch input member (6) being in contact with or close to the surface (2) generating a distance sensor signal. Since conventional resistive or capacitive touch-sensitive layers have a limited transparency, they significantly reduce the screen quality. According to the invention, a display device having touch sensitivity functionality is provided without adding a layer to the display, and is characterized in that the touch-sensitive means (5) comprises means (51) for emitting a laser beam (4, 8) in a plane parallel and close to the surface (2), said laser beam being periodically deflected across the entire surface (2), and means (51, 60) for receiving the light reflected or scattered from the touch input member (6) generating said distance sensor signal therefrom.

14 Claims, 2 Drawing Sheets

DEVICE HAVING TOUCH SENSITIVITY FUNCTIONALITY

Figure 1:
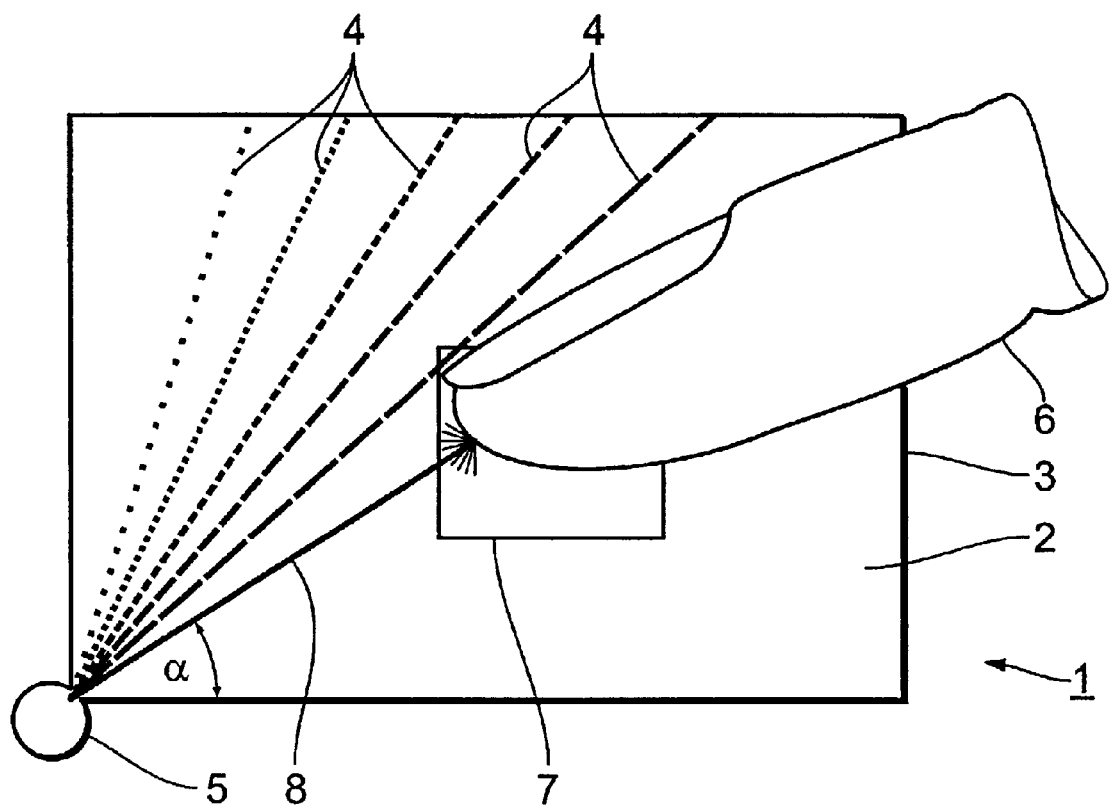

The invention relates to a device having touch sensitivity functionality comprising a surface and touch-sensitive means for detecting the presence of a touch input member being in contact with or close to the surface generating a distance sensor signal. The invention further relates to a touch sensitivity display device, to a keyboard and to a method of sensing a touch of a touch sensitivity device by a touch input member in such a device.

High resolving LCD screens enter more applications such as mobile phones and portable control devices. Touch screen functionality of these screens is desired in most of these applications. To determine where a display screen is touched, capacitive and resistive touch-sensitive layers are commonly used. They are based on transparent conductors such as indium-tin oxide films. Their disadvantage is the limited transparency which reduces the picture quality, particularly of modern high resolving LCD displays.

Another concept of detecting the presence of a touch input member being in contact with the display screen is based on an orthogonal array of paired light emitters and detectors for covering the display surface with crossed light beams and scanning means coupled to the emitters and detectors for electronically scanning the orthogonal arrays such that a single emitter at any one time is emitting light. Such a display device is, for instance, described in U.S. Pat. No. 4,301,447.

It is therefore the object of the present invention to provide a device having touch sensitivity functionality which does not require to add a layer to the surface, e.g. to the display screen, reduces the picture quality and does not further require a plurality of light emitters and detectors and complex control and image processing means. Particularly, a cheap and reliable solution is required.

This object is achieved by a device which is characterized in that that the touch-sensitive means comprises means for emitting a laser beam in a plane parallel and close to the surface, said laser beam being periodically deflected across the entire surface, and means for receiving the light reflected or scattered from the touch input member generating said distance sensor signal therefrom.

The invention is based on the idea of using distance measurement by means of a laser. The simple and cheap method of measuring a distance using a laser beam is generally known. This method shall be applied to a device in order to provide a touch sensitivity, thus avoiding an additional layer or arrays of light emitters and detectors as well as complex control and processing means.

According to the invention, a laser beam is emitted by a laser-emitting and detecting means such that it periodically scans the entire surface. If no such input member is in contact with the display screen or at least so close to the surface that it is hit by the laser beam, which touch input member may be, for instance, an electronic pen, a pointer or a user's finger, the laser beam is reflected or scattered from the frame of the surface into the laser detector or there is no laser beam reflected. If a touch input member is in contact with the surface or at least so close to the surface that it is hit by the laser beam, the laser beam is reflected or scattered from the touch input member into the laser detector. The distance sensor signal generated by a laser detector will then show a significant change and, will allow determination of the position of the touch input member on the surface. Since an optical principle is used according to the invention, the solution is highly reliable and precise.

Preferred embodiments of the invention are defined in the dependent claims. Preferably, the position of the touch input member is calculated from the angle of emission of the laser beam and from the distance between the laser-emitting and detecting means and the direction of reflection, which distance is included in or can be derived from the light received by the laser detector. Particularly, in the phase of the light received by the laser detector as a function of the varying laser emission wavelength, information about the length of the way the laser light has gone from the laser-emitting and detecting means to the laser detector is included.

Preferably, the touch-sensitive means comprises a laser diode and a photo diode. Advantageously the laser diode is commonly used for emitting and detecting the laser beam. The light emitted from the laser diode is scattered back into the laser diode, thus modulating the emitted laser beam.

Furthermore, the laser-emitting and detecting means and the laser detector are preferably positioned within the frame of the display screen, particularly in the same corner of the frame. Thus, the invention can be easily used for any screen size and type which is important for mass production.

According to a preferred embodiment, the frame of the surface is not used to scatter the light and generate a distance reading. Only if a touch input member is in contact with the surface or is at least so close to the screen that it is hit by the laser beam, the laser beam is reflected or scattered from the touch input member into the laser detector. If no touch input member is present, no distance reading is generated.

Alternatively, laser reflection means, e.g. reflecting surfaces, can be put at certain positions on the frame, preferably in one or more corners so that the position of the beam and/or the surface size can be calibrated. Basically, such laser reflection means may simply comprise a white frame sufficiently reflecting and/or scattering the laser beam. In this way—if no touch input member is present—the distance between the laser-emitting and detecting means and the frame is continuously measured. When a touch input member is present, before hitting the touch input member and after hitting the touch input member, the distance to the frame is measured. This information can be used to calibrate the angle of the laser beam while hitting the touch input member. In the time when hitting the touch input member with the laser beam, the distance between the touch input member and the sensor is measured. The resulting information about angle and distance can be used to determine the coordinate where the screen is touched.

The laser-emitting and detecting means are preferably positioned for emitting the laser beam in a plane directly above the display screen. Thus it is quite easy to detect if a touch input member comes in contact with the surface or even if it is already very close to the surface. Alternatively, the laser-emitting and detecting means could also be positioned slightly below the surface or a layer above the surface such that the laser beam is emitted in a plane directly under the surface or said layer. In order to detect if a touch input member is in contact with the surface or said layer, it is necessary that the surface or said layer is flexible and that the touch input member generates a depression in the surface or said layer such that the laser beam is reflected from this depression instead of from the frame of the surface.

According to a preferred embodiment, distance measurement based on laser selfmixing is used. Therefore a laser diode is commonly used as laser-emitting and detecting means and as laser detector and the light emitted from the laser diode is scattered back into the laser diode thus modulating the generated laser beam. These modulations— commonly also called "undulations"—are detected by monitoring the laser output power with a detecting means, commonly a photodiode. If the laser diode itself is current-modulated, this effect can be used to measure the distance between the laser diode and the target, i.e. between the laser diode and the frame reflecting the laser beam or the contact point of the touch input member reflecting the laser beam. The simple and cheap method of measuring distances based on laser selfmixing is known in general, but can be favourably applied to a display screen to implement touch sensitivity functionality.

For deflecting the laser beam periodically across the entire display screen, oscillating means are preferably provided which periodically change the orientation of a mirror for deflecting the laser beam. Preferably, said oscillating means comprises an electronically driven mechanical oscillator such as is known from simple battery-powered mechanical alarm clocks or watches. However, other implementations of oscillating means are also possible.

Figure 2:
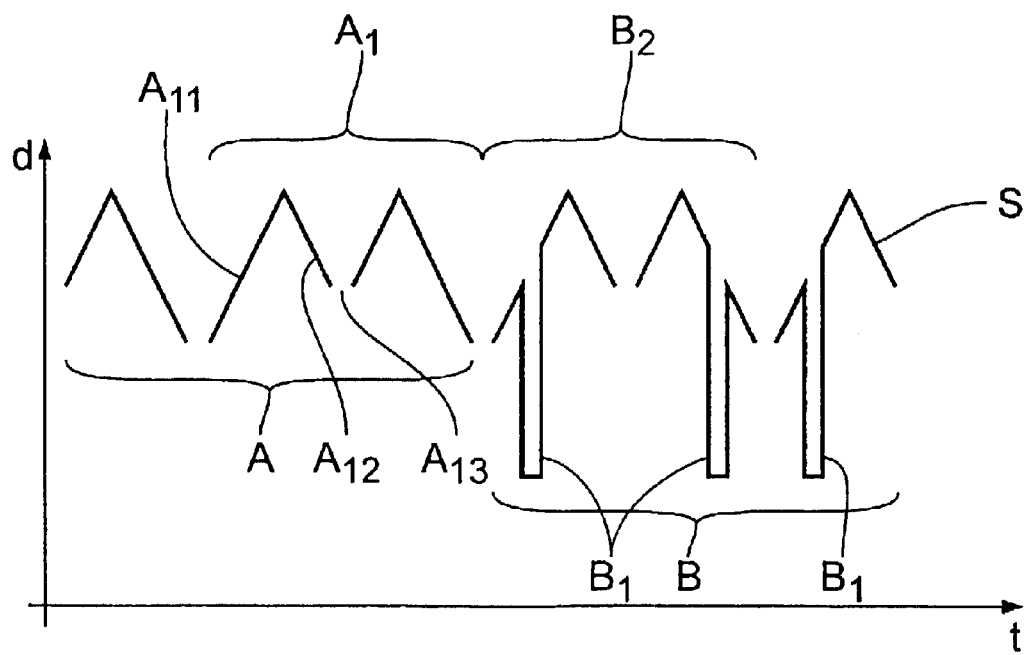
Figure 3:
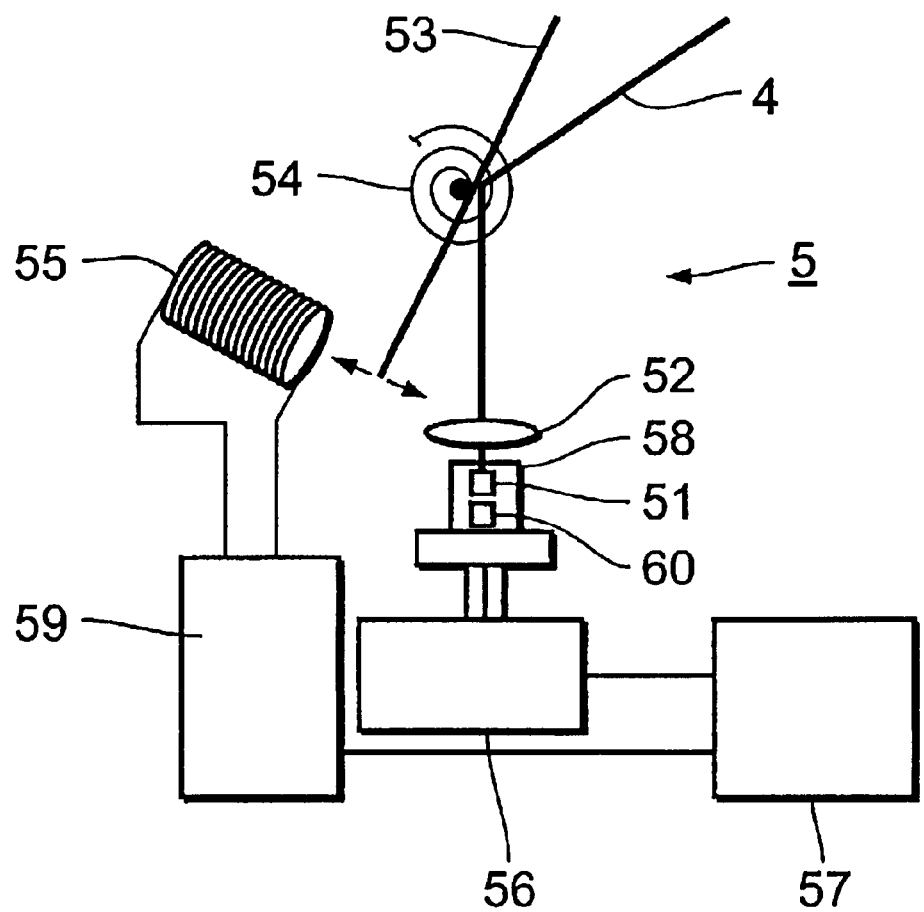

The invention will now be explained in more detail with reference to the drawings, in which FIG. 1 shows a diagram illustrating the principle of the invention, FIG. 2 shows a sensor signal according to the invention, and FIG. 3 shows means for deflecting the laser beam according to the invention.

FIG. 1 shows a first embodiment of a display device 1 according to the invention. The display device 1 comprises a display screen 2, i.e. a surface, having a frame 3 for reflecting or scattering laser beams 4 or 8 emitted from laser-emitting and detecting means 5 which may include a laser diode. Said means 5 is arranged preferably in one corner of said rectangular display screen 2 and emits a laser beam which is periodically directly deflected above the surface of the entire display screen 2, i.e. the surface of the display screen 2 is periodically scanned by the laser beams 4 or 8. The laser beam is generated in such a way that it is emitted in a plane directly above the surface of the display screen so that it can be interrupted by a touch input member coming in contact with or being in close proximity with the surface of the display screen 2. The laser beam 4 or 8 is denoted 4 when it ends on the frame 3 of the display device. The moment when it is scattered from a touch input member, it is denoted 8. Both numerals, 4 and 8 refer to the same laser beam at different moments.

If a touch input member, e.g. a user's finger 6 does not touch the display screen 2, the laser beam 4 is reflected or scattered from the frame 3 of the display screen 2 so that the light is scattered back into the laser-emitting and detecting means 5. The laser diode included therein and being used for emitting the laser beam is thus also used for detecting the light scattered back. The light output of the diode thus undergoes modulations (undulations). Since the laser diode itself is current-modulated, this effect can be used to measure the distance between the laser diode and the place of reflection of the laser beam 4. Thus, if no touch input member 6 is in contact with the display screen 2, the distances between the laser-emitting and detecting means 5 and the point of the frame 3 the laser points to is determined from the sensor signal generated by the laser diode after receiving the light scattered back.

If a touch input member 6 comes in contact with the display screen 2, e.g. if a user touches the display screen 2 at a certain point, e.g. on a displayed touch bottom 7, the laser beam 8 emitted at the angle α is interrupted and reflected or scattered from the finger 6 instead of from the frame 3. Thus a shorter distance between the laser-emitting and detecting means 5 and the place of reflection of the laser beam 8 will be reported. This signal change can be used to trigger an interrupt reporting the event that the display screen 2 was touched and to calculate the position of the touch.

An example of a sensor signal generated by the laser detector included in the laser emitting and detecting means 5 is shown in FIG. 2. Therein, the measured distance d between the laser emitting and detecting means 5 and the place of reflection is recorded with respect to time t.

The first part A of the sensor signal S shows the distances d that were recorded before the display screen was touched. The part A1 thereof shows the distances reported during one period of scanning by the laser beam 4, starting from the upper left corner to the lower right corner and back in the embodiment shown in FIG. 1. The portion A11 of the signal S is recorded due to scanning along the long (horizontal) side of the display screen, while the portion A12 of the signal S is recorded due to scanning along the short (vertical) side of the display screen. The break A13 when no signal is detected indicates when the laser beam hits an absorbing surface that can be used to indicate the position where the scan changes the direction. The distance that was recorded before the display screen was touched can be used to calibrate the distance reading at the moment the display screen was touched.

The following part B of the sensor signal S shows the distances d that were recorded while the display screen was touched. The part $B_2$ thereof is recorded during a complete scan across the display screen. As can be seen, the signal S is changed in period B compared to period A in that it shows low peaks $B_1$ due to the shorter distance measured due to the reflection of the laser beam of the touch input member. This shorter distance indicates the distance between the touch input member and the measuring device. The time length of the peaks B1 indicate the radius of the touch input member touching the display screen devised by its distance from the measuring device while their position is a measure of the angle of the touch input member with respect to the corner of the display screen where the laser emitting and detecting means is positioned. In this way, the angle of the touch input member with respect to this corner can be calibrated.

The angle of the laser beam and thus the touch input member can also be determined with other methods, such as measuring the angle of a deflecting mirror if used to set the angle of the laser beam. The absolute contact position, i.e. the (x, y)-coordinate, can be calculated from the angle of the laser beam and the distance. These calculations can be made in the driver software of the laser emitting and detecting means 5. It can also be made by the device for which the touch input is generated, i.e. a computer, a PDA or similar device, which keeps the means 5 itself very simple.

The distance information generated while measuring the distance to the frame can be used to calibrate the angle of the laser beam. When a touch input member is detected, the average between the angle of the laser beam before and after hitting the touch input member is a good measure of the angle of the beam while hitting the touch input member.

A preferred embodiment of the laser emitting and detecting means 5 is shown in FIG. 3. Therein, a laser diode 51 emits a laser beam 4 or 8 which, after passing through a lens 52, is reflected by a mirror 53 mounted on an electrically driven mechanical oscillator. Said mechanical oscillator comprises a spring 54 and an electromagnetic coil 55 driven by drive electronics 59. Such a mechanical oscillator, particularly a balance wheel of such a type, can be found in cheap battery-powered mechanical alarm clocks and in most watches. The orientation of the mirror 53 is thus periodically changed as indicated by, arrows, thus changing the angle of reflection of the laser beam 4 or 8 which is thus periodically deflected directly above the surface of the entire display screen. The emission of the laser beam by the laser diode 51 is measured by detector 60 and controlled by electronics 56. If desired, electronics 59 and 56 can be integrated in one unit.

The reflected laser beam is scattered back into the laser diode, 51 via the same path of light. The light output of the laser diode 51 thus undergoes modulations (undulations). The undulations are detected with a light-sensitive detector 60, preferably a photodiode, which is often already integrated in a commercially available laser diode package 58. Since the laser diode 51 itself is current-modulated by the drive unit 56, the selfmixing effect of the laser diode 51 can be used to measure the distance between the laser diode and the point of reflection. The laser diode 51 thus generates a distance sensor signal which is inputted into signal processing means 57 for determining the distance between the laser diode 51 and, if desired, the angle of reflection and, if also desired, for determining if a touch input member has come in contact with or is very close to the display screen.

The angle of reflection can be determined in different ways: One way is from the information of the measured distance over time that is displayed in FIG. 2. This can be done in an electronic or logic circuitry 57. Alternatively, the circuitry 57 can only be used to communicate all information to an algorithm or driver software that is operating in the device, i.e. a computer or piece of mobile equipment for which the touch input sensor is used. Another possibility is to use the periodic movement of the deflecting device, i.e. the mirror 4. Also this information can be processed inside the electronic or logic circuitry 57 or in the device, i.e. a computer or piece of mobile equipment for which the touch input sensor is used. Using the information of the angle and the information of the distance, the coordinate of the input can be determined. Also this processing can be done in the circuitry 57 or in the device i.e. a computer or piece of mobile equipment for which the touch input sensor is used.

If desired, the oscillator driver 59 can be controlled by electronics 57 or give timing information to electronics 57. A link between 59 and 57 is not necessary, because the direction (angle) of the beam can be derived from the measured distance to the frame of the screen.

For the periodic actuation of the mirror 53 or, even more general, for deflecting the laser beam 4, other methods can be used as well. It is, for example, possible to use a piece of metallized reflecting resonantly driven piezoelectric foil as an extremely cheap deflector. The invention can be applied to any kind of display including LCDS and CRTs in any kind of application such as mobile phones, advanced remote controls, notebooks or touch screen user interfaces.

In order to improve reflection of the laser beam from the frame 3 of the display screen 2, reflection means 31, e.g. small mirrors or reflection plates can be arranged in the frame 3, at least in the corners of the frame 3. These reflection means are arranged in such a way that the laser beams 4 emitted from the laser-emitting and detecting means 5 are reflected so that the reflected or scattered laser beams 4 are directed back into a laser detector.

The invention may be applied to any kind of device where a touch sensitivity functionality shall be provided. Preferred applications are touch screens, electronic keyboards or any kind of input devices. A surface having touch sensitivity functionality can therein also be partially marked as keyboard and partially as display or screen.

What is claimed is:

1. A device having touch sensitivity functionality, comprising:
    a surface,
    a touch-sensing component that includes:
        a laser emitter that is configured to emit a laser beam,
        a deflector that is configured to deflect the laser beam across the surface in a plane parallel to the surface,
        a detector that is configured to detect light from the laser beam that is reflected from a touch input member, and
        a signal generator that is configured to generate a distance sensor signal that is dependent upon a distance between the detector and the touch input member.

2. The device of claim 1, further including
    a signal processor that is configured to determine a position of the touch input member relative to the surface, based on the distance sensor signal.

3. The device of claim 2, wherein
    the distance sensor signal is also dependent upon it deflection angle of the laser beam across the surface, and
    the signal processor determines the position based on the deflection angle and the distance between the detector and the touch input member.

4. The device of claim 1, wherein
    the laser emitter includes a laser diode, and
    the detector includes a photodiode.

5. The device of claim 4, wherein
    the light front the laser beam that is reflected from the touch input member is scattered back to the laser diode, thereby modulating the emitted laser beam.

6. The device of claim 1, wherein
    the touch-sensitive component is mounted at a corner of a frame that encloses the surface.

7. The device of claim 1, wherein
    the laser emitter is configured to emit the laser beam in a plane directly above the surface.

8. The device of claim 1, wherein
    the detector is further configured to receive light reflected from a frame of the surface, and
    the signal generator is further configured to generate the distance sensor signal that is dependent upon a distance between the emitter and the frame as well as the distance from the emitter to the touch input member.

9. The device of claim 1, wherein
    a frame of the surface includes laser reflectors positioned to reflect the laser beam to the detector.

10. The device of claim 1, wherein
    the touch-sensing component includes:
        an oscillator that is configured to reflect the laser beam periodically across the entire surface by periodically changing an orientation of a mirror that deflects the laser beam.

11. The device of claim 1, wherein
    the oscillator includes an electronically driven mechanical oscillator.

12. The device of claim 1, wherein
    the surface corresponds to a display screen.

13. The device of claim 1, wherein
    the surface corresponds to a keyboard, and includes alphanumeric markings.

14. A method of sensing touch of a surface by a touch input member, comprising:
    emitting a laser beam
    deflecting the laser beam across the surface in a plane parallel to the surface,
    detecting light from the laser beam that is reflected from the touch input member, and
    generating a distance sensor signal that is dependent upon a distance between the detector and the touch input member.

* * * * *